US007966361B1

(12) United States Patent
Moni et al.

(10) Patent No.: US 7,966,361 B1
(45) Date of Patent: Jun. 21, 2011

(54) SINGLE-CYCLE MODULUS OPERATION

(75) Inventors: Shankar Moni, Indiranagar (IN); Pankaj Chaurasia, Sunnyvale, CA (US)

(73) Assignee: NVIDIA Corporation, Santa Clara, CA (US)

(*) Notice: Subject to any disclaimer, the term of this patent is extended or adjusted under 35 U.S.C. 154(b) by 1040 days.

(21) Appl. No.: 11/657,894

(22) Filed: Jan. 24, 2007

Related U.S. Application Data

(60) Provisional application No. 60/772,428, filed on Feb. 10, 2006.

(51) Int. Cl.
*G06F 7/72* (2006.01)
(52) U.S. Cl. .................................................. 708/491
(58) Field of Classification Search .................. None
See application file for complete search history.

(56) References Cited

U.S. PATENT DOCUMENTS

| 4,722,067 | A  | * | 1/1988  | Williams ...................... 708/491 |
| 5,585,931 | A  |   | 12/1996 | Juri et al. |
| 5,818,529 | A  |   | 10/1998 | Asamura et al. |
| 5,990,812 | A  |   | 11/1999 | Bakhmutsky |
| 6,097,842 | A  |   | 8/2000  | Suzuki et al. |
| 7,167,885 | B2 | * | 1/2007  | Hojsted ........................ 708/491 |
| 2002/0044603 | A1 |   | 4/2002 | Rajagopalan et al. |
| 2003/0182339 | A1 | * | 9/2003 | Hojsted ........................ 708/491 |
| 2004/0013399 | A1 |   | 1/2004 | Horiguchi et al. |
| 2005/0201463 | A1 |   | 9/2005 | Lee et al. |
| 2005/0246406 | A9 | * | 11/2005 | Hojsted ........................ 708/491 |

FOREIGN PATENT DOCUMENTS

| EP | 1575301 | 9/2005 |
| EP | 1879388 | 1/2008 |
| JP | 08046971 | 2/1996 |
| JP | 2001016594 | 1/2001 |
| JP | 2004242309 | 8/2004 |
| WO | 9529561 | 11/1995 |

OTHER PUBLICATIONS

Ad hoc group on MPEG-4 video VM editing; MPEG-4 Video Verification Model Version 7.0; Video Group; Bristol, Apr. 1997.
Advanced Video Coding for Generic Audiovisual Services; Series H: Audiovisual and Multimiedia Systems; ITU-T (International Telecommunication Union) Mar. 2005.

* cited by examiner

*Primary Examiner* — David H Malzahn

(57) ABSTRACT

Several different approaches to performing the modulus operation are presented. In one, a method of performing the modulus operation upon a dividend and a divisor within a limited range is discussed. The method involves storing a reference value, receiving a dividend value, and calculating a number of derived inputs. Each of the derived inputs corresponds to the dividend value minus the reference value, and is then further modified by a multiple of the divisor. Using the divisor to select between these derived inputs provides the answer.

20 Claims, 5 Drawing Sheets

Multiplexer (mux) 300

Multiplexer (mux) 300

Computing Device 400

Flowchart 500

SINGLE-CYCLE MODULUS OPERATION

This application claims the benefit under 35 U.S.C. §119 (e) of U.S. Provisional Application Ser. No. 60/772,428, filed on Feb. 10, 2006, to Moni et al., entitled "SINGLE-CYCLE MODULUS OPERATION" which is incorporated herein in its entirety.

BACKGROUND

1. Field of the Invention

The field of the present invention pertains to performing mathematical operations. More particularly, the present invention relates to performing the modulus operation over a limited range.

2. Related Art

The modulus operator, represented in many programming languages as %, and sometimes called a remainder function, is used extensively in many applications. Some of these applications include video and audio compression techniques, e.g., the H.264 standard. Traditional methods of computation involving the modulus operator are relatively expensive, in terms of processor cycles and power consumption. For example, one common method of implementing the modulus operator is to continually loop subtraction operations until the remainder has been determined, which involves progressively more operations, as the dividend goes larger. For example, when calculating 4% 3, 3 is subtracted from 4 until a number between 0 and 2 remains, e.g., once. When calculating 17% 3, 3 is subtracted from 17 repeatedly until a number between 0 and 2 remains, e.g., five times, and that remainder is reported as the result of the modulus operation. Progressively larger dividend numbers results in progressively greater numbers of subtraction operations that must be performed.

Table 1, below, shows the modulus operator.

TABLE 1

| The Modulus Operator |
| --- |
| dividend mod divisor = remainder |
| a % b = c |

The modulus operator is used extensively in image and video processing, particularly in compression related applications. For example, given a macroblock number or pixel number, the horizontal and/or vertical coordinates of the macroblock or pixel can be determined. Another application, utilized in, e.g., the H.264 standard, is referencing a table of quantization values in the periodic manner. For example, the location of the table Lookup specified by the H.264 standard for a quantization parameter QP is "QP % 6."

The traditional approach to the modulus operator are computationally very expensive, particularly in video applications. Performing dozens, or hundreds, of modulus operations on every frame of digital video data, with each modulus operation in that frame taking progressively greater computational time to resolve, means that video compression according to the specified standard require significant processing overhead.

SUMMARY

Several different approaches to performing the modulus operation are presented. In one, a method of performing the modulus operation upon a dividend and a divisor within a limited range is discussed. The method involves storing a reference value, receiving a dividend value, and calculating a number of derived inputs. Each of the derived inputs corresponds to the dividend value minus the reference value, and is then further modified by a multiple of the divisor. Using the divisor to select between these derived inputs provides the answer.

One approach involves accessing a reference value and a dividend value. A plurality of derived inputs are calculated, wherein each of the derived inputs corresponds to the dividend value minus some multiple of a divisor value. The divisor value can then be used to select the result of the modulus operation, by selecting between the derived inputs, where the answer will be less than the value of the divisor, but not negative.

In another approach, a multiplexer is used to perform the modulus operation. The multiplexer has a selector value input, and a plurality of value inputs. Each of the plurality of value inputs corresponds to a dividend value and a multiple of the selector value. The selector value can then be used to choose between the plurality of value inputs.

Another approach involves a computing system. The system includes a multiplexer, a starting point register, an input register, and a selector value. The multiplexer is configured to receive a dividend value from the input register, a starting point value from the starting point register, and the selector value. The multiplexer is also configured to perform a modulus operation upon the dividend value, using the selector value, where the modulus operation involves selecting between a plurality of derived inputs, with the derived inputs corresponding to the dividend, the starting point value, and the selector value.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Figure 1:
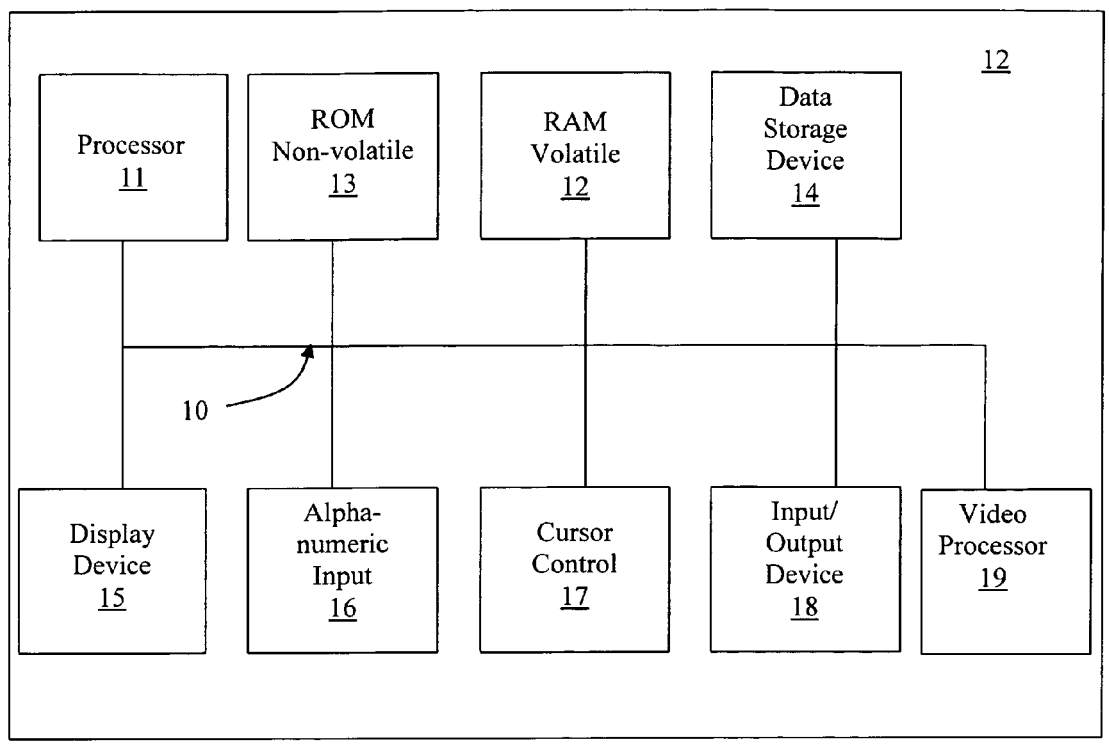
FIG. 1 depicts an exemplary computer system, upon which embodiments of the present invention may be practiced.

Reference will now be made in detail to several embodiments of the invention. While the invention will be described in conjunction with the alternative embodiment(s), it will be understood that they are not intended to limit the invention to these embodiments. On the contrary, the invention is intended to cover alternative, modifications, and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one skilled in the art that the present invention may be practiced without these specific details or with equivalents thereof. In other instances, well-known methods, procedures, components, and circuits have not been described in detail as not to unnecessarily obscure aspects of the present invention.

Portions of the detailed description that follows are presented and discussed in terms of a method. Although steps and sequencing thereof are disclosed in a figure herein (e.g., FIG. 5) describing the operations of this method, such steps and sequencing are exemplary. Embodiments of the present invention are well suited to performing various other steps or variations of the steps recited in the flowchart of the figure herein, and in a sequence other than that depicted and described herein.

Some portions of the detailed descriptions, which follow, are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "accessing," "writing," "including," "testing," "using," "traversing," "associating," "identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Exemplary Computer System

Referring now to FIG. 1, a block diagram of an exemplary computer system 12 is shown. It is appreciated that computer system 12 described herein illustrates an exemplary configuration of an operational platform upon which embodiments of the present invention can be implemented. Nevertheless, other computer systems with differing configurations can also be used in place of computer system 12 within the scope of the present invention. That is, computer system 12 can include elements other than those described in conjunction with FIG. 1. In several embodiments, for example, a media server or a personal video recorder (PVR) is utilized, in place of system 12. In another embodiment, system 12 is connected to a network attached storage device (NAT). Moreover, the present invention may be practiced on any system which can be configured to allow it, not just computer systems like computer system 12.

Computer system 12 includes an address/data bus 10 for communicating information, a central processor 11 coupled with bus 10 for processing information and instructions; a volatile memory unit 12 (e.g., random access memory [RAM], static RAM, dynamic RAM, etc.) coupled with bus 10 for storing information and instructions for central processor 11; and a non-volatile memory unit 13 (e.g., read only memory [ROM], programmable ROM, flash memory, etc.) coupled with bus 10 for storing static information and instructions for processor 11. Computer system 12 may also contain an optional display device 15 coupled to bus 10 for displaying information to the computer user. Moreover, computer system 12 also includes a data storage device 14 (e.g., hard disk drive) for storing information and instructions.

Also included in computer system 12 is an optional alphanumeric input device 16. Device 16 can communicate information and command selections to central processor 11. Computer system 12 also includes an optional cursor control or directing device 17 coupled to bus 10 for communicating user input information and command selections to central processor 11. Computer system 12 also includes signal communication interface (input/output device) 18, which is also coupled to bus 10, and can be a serial port. Communication interface 18 may also include wireless communication mechanisms. Using communication interface 18, computer system 12 can be communicatively coupled to other computer systems over a communication network such as the Internet or an intranet (e.g., a local area network). Also included in computer system 12 is video processor 19. In some embodiments, video processor 19 is incorporated into central processor 11. In other embodiments, video processor 19 is a separate, discrete component. In other embodiments, video processor 19 is incorporated into another component. In other embodiments, video processor 19 is included in system 12 in other ways.

It is understood that embodiments of the present invention can be practiced on many different types of computer system 12. Examples include, but are not limited to, desktop computers, workstations, servers, media servers, laptops, gaming consoles, and personal digital assistants (PDAs), as well as other electronic devices with computing and data storage capabilities, such as wireless telephones, media center computer, digital video recorders, digital cameras, and digital audio playback or recording devices.

Limited Range Modulus Operation

In many applications where the modulus operator is used, the range in which the modulus operator is to be applied is fairly narrowly bounded. In these applications, the expected range of the dividend specified in the operation tends to fall within a fairly tight range, e.g., five times the divisor. Additionally, while the starting point for this range will change almost continuously throughout the application, this change is predictable and ordered, and can therefore be accounted for.

For example, when processing macroblocks in a frame of video data, each macroblock has still macroblock number, but the macroblock number of the current macroblock is greater than or equal to the macroblock number of the first macroblock of the current row. There may be hundreds, or thousands, of macroblocks in a given frame, but only a limited range of macroblocks is being processed at any one time, e.g., one row or one column at a time. This is illustrated by Table 2, below.

TABLE 2

(exemplary)

Permissible Range of Dividend:
(a − starting point (sp)) <= 5 * b
If SP = 1000, and b = 3: 1000 <= a <= 1015

Embodiments of the present invention, therefore, include a special-purpose instruction which, in combination with hardware and software, performs modulus operations in applications where the range of the dividend is limited. In some embodiments, modulus operations can be completed in one processor cycle, resulting in significant savings in terms of processor time and power consumption. In several further embodiments, some additional overhead is added by updating the starting point, e.g., storing SP in a register, whenever the starting point is changed, e.g., at the beginning of a new macroblock row. In most such embodiments, updating the starting point may also be accomplished in one processor cycle.

Images and Macroblocks

Figure 2:
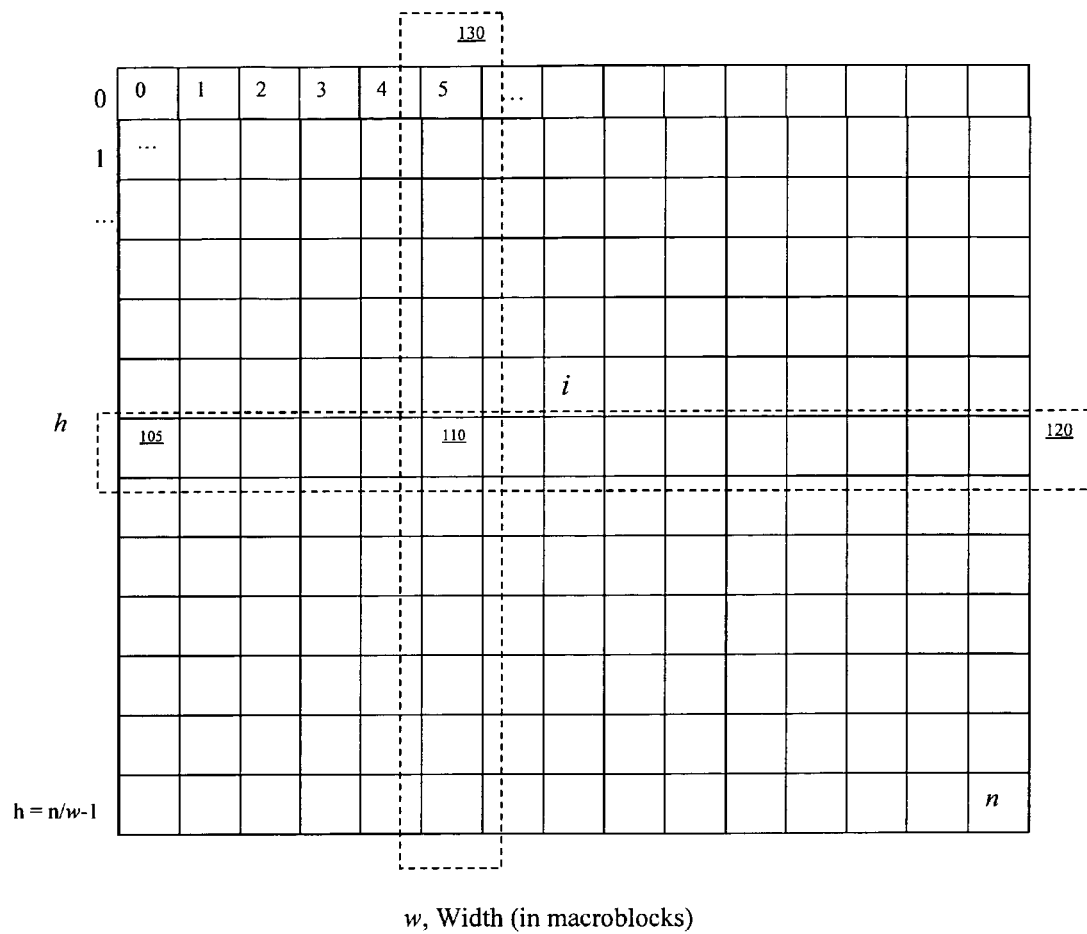
FIG. 2 depicts an exemplary image divided into macroblocks.

With reference now to FIG. 2, an exemplary image 100 is depicted, broken into macroblocks. Image 100 is composed of n macroblocks. As depicted, image 100 is w macroblocks wide (columns), and h macroblocks tall (rows). For any given macroblock i, such as macroblock 110, the position of that macroblock can be given and is a combination of coordinates, e.g., row 120 and column 130. At various times during operation of a video compression standard, such as the H.264 standard, it is necessary to determine the position of the current macroblock, e.g., macroblock 110, within the current macroblock row, e.g., row 120. This determination can be carried out by calculating the result of a modulus operation, e.g., i % w.

The traditional approach to solving this problem would involve repeated subtraction of w from i, until a number between 0 and w−1 remained. The further into image 100 macroblock 110 is, the more subtraction operations would need to be performed.

In some embodiments, this modulus operations solved by subtracting a starting value from the current macroblock number, and taking the modulus operation of the result of that subtraction. Given the current row number, as well as w, a starting point can be easily determined, and updated as processing proceeds through image 100. For example, if row 120 is the seventh row of image 100, and image 100 is 15 macroblocks wide, the macroblock in the first position of row 120, shown as macroblock 105, has a macroblock number of 105. To determine the position of macroblock 110 within row 120, e.g., to determine what column macroblock 110 is in, the operation depicted in Table 3 can be performed.

TABLE 3

(current macroblock number − starting point)% w =
(110 − 105)% 15 = 5

By using a limited range, combined with a known starting point, a single subtraction operation returns information that previously would have taken seven subtraction operations to calculate.

Bands of Values:

In some embodiments, it is advantageous to further differentiate within the defined range for the dividend, as shown, for example, above in Table 2. In some embodiments, subdividing the available range into several smaller bands is desirable, e.g., to determine a macroblock's position within a super block, as well as within the current row; also, in some embodiments, the subdivisions allow for several simpler operations to be performed, in place of a single more complex one. Once it is known which band a macroblock lies in, a predetermined subtraction operation can be performed, to return the modulus value.

Table 4, below, sets out a relationship which can be tested with different values until true.

TABLE 4

1: a − RefVal − k*b <= b < a − RefVal + (k + 1)*b
k = 0, 1, 2, . . . , n

As applied to the preceding example with macroblock 110, given a reference value, or starting point, of macroblock 105, and the value of b equal to 3, relationship 1 is true when k=1, indicating that macroblock 110 lies in band number one. To determine the position of macroblock 110 within band number 1, the operation depicted in Table five, below, is carried out.

TABLE 5 a − SP − k*b = 110 − 105 − (1*3) = 2

Multiplexer

In some embodiments, this approach is implemented by utilizing a multiplexer, or mux. In these embodiments, the starting point, SP, is first subtracted from the dividend, a. This yields a number, x, which falls within the allowable range for the dividend. Next, for the inputs to the mux, a divisor, b, is subtracted from x a number of times. The divisor, b, is also used as a selector for the mux; of the inputs, only one will be greater than zero and less than b, and hence will be the answer.

Figure 3:
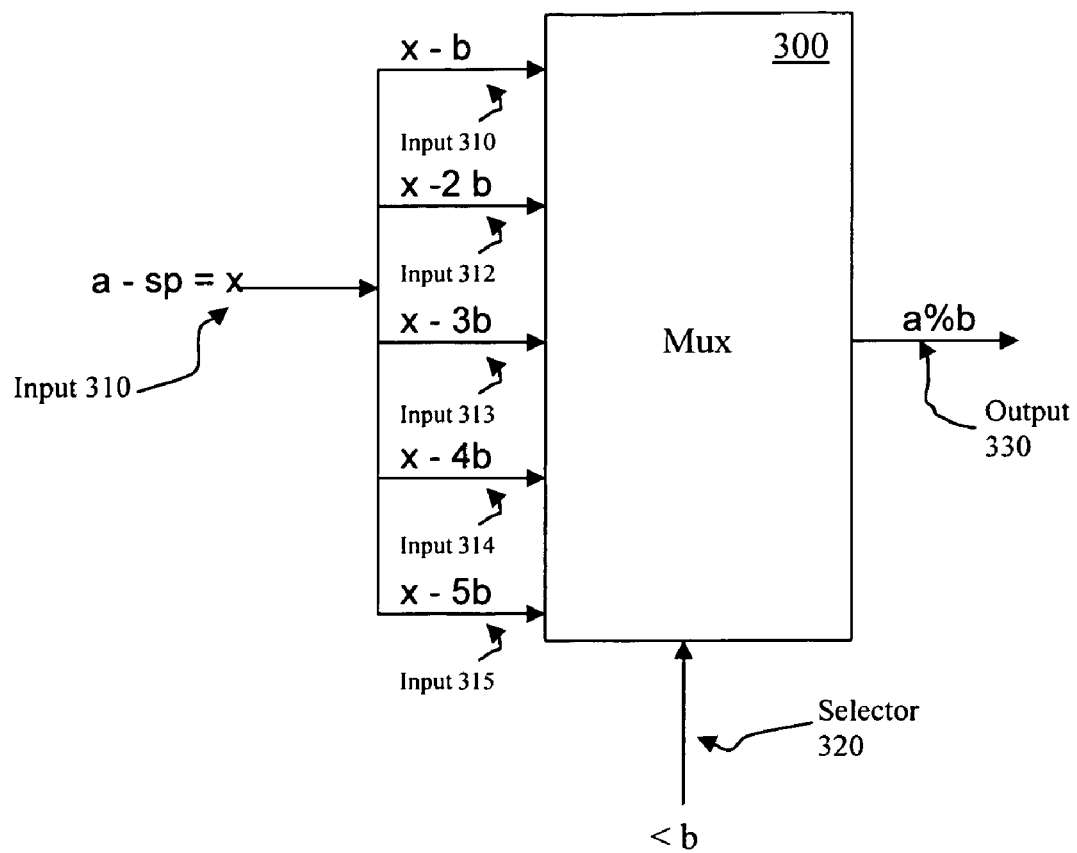
FIG. 3 depicts a multiplexer, in accordance with one embodiment of the present invention.

With reference now to FIG. 3, a mux 300 is depicted, in accordance with one embodiment of the present invention. Although mux 300 is depicted as incorporating certain specific elements and features, it is understood that mux 300 is exemplary in nature. In other embodiments, additional, fewer, or different elements or features are incorporated. Further, while mux 300 is depicted as a multiplexer, is understood that different, equivalent configurations of hardware, software, or combinations of both can be used in different embodiments to achieve the same effect. For example, in one embodiment, a field programmable gate array (FPGA) is utilized, in place of mux 300.

Mux 300 a shown as receiving input 310, which is the value x, or a-SP. A number of subtraction operations are performed upon input 310, to produce derived inputs 311, 312, 313, 314, and 315. Derived inputs 311 through 315 range in value from x−b to x−5b, establishing five bands of values, each b in width. It is understood that while mux 300 is shown as having five derived inputs derived from input 310, in other embodiments, different members of derived inputs are created. For example, in some embodiments, six derived inputs are created, with values ranging from x+b to x−4b.

In some embodiments, the value of b is hardwired into mux 300. In other embodiments, the value of b is configurable, allowing the five bands of values represented by derived inputs 311 through 315 to be altered.

In some embodiments, the number of derived inputs received by mux 300 are fixed when mux 300 is created. In other embodiments, the number of derived inputs is configurable, allowing the number of bands of values represented by the derived inputs to be altered.

Mux 300 also receives selector 320. In the depicted embodiment, selector 320 is used to select between derived inputs 311 through 315, to determine which derived input has a nonnegative value less than b.

Mux 300 produces output 330. Output 330, in the depicted embodiment, is the solution to a % b. In some embodiments, output 330 identifies the position of macroblock a within one of the bands of values.

Computing Device

Figure 4:
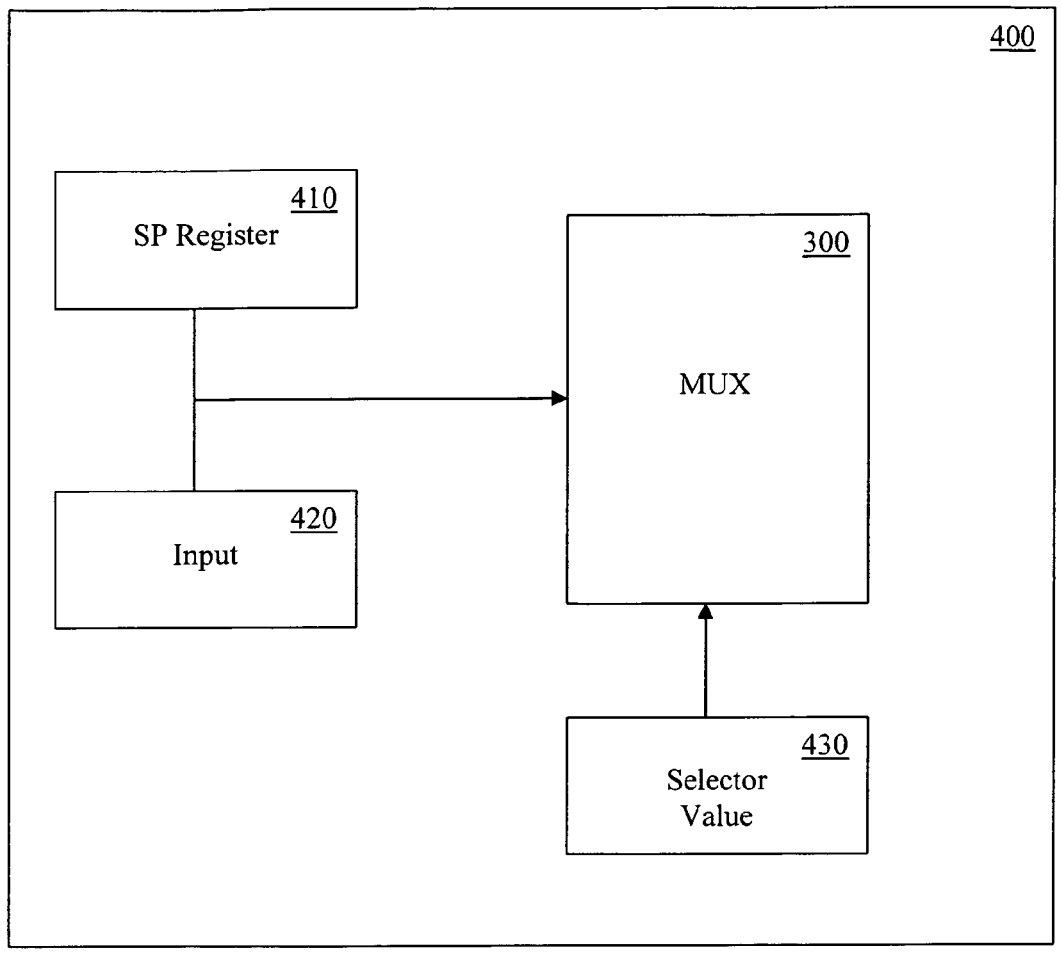
FIG. 4 depicts a computing device, in accordance with one embodiment of present invention.

With reference now to FIG. 4, a computing device 400 for calculating the modulus operation is depicted, in accordance with one embodiment of the present invention. While computing device 400 is depicted as incorporating specific, enumerated components, it is understood that, in other embodiments, different, additional, or fewer components are utilized. In some embodiments, the function of several components are combined into fewer components, or the functions of a component may be separated into several components.

Computing device 400 is depicted as including SP register 410. SP register 410, in the depicted embodiment, is a register, memory module, or other similar, writable data storage element. SP register 410 is utilized by computing device 400 to store the current starting point value for the operation of the modulus operand.

Computing device 400 is also shown as including input register 420. Input register 420, in the depicted embodiment, is a register, memory module, or other similar, readable data storage element. Input register 420, as shown, is used to store the present value of the dividend, e.g., a, for the operation of the modulus operand.

Computing device 400, in the depicted embodiment, includes selector value 430. In some embodiments, selector value 430 is fixed when computing device 400 is created, e.g., selector value 430 is hardwired into a microprocessor. In other embodiments, selector value 430 is configurable, e.g., selector value 300 is stored in a register, or other writable memory element.

In some embodiments of computing device 400, not pictured, multiple muxes 300 are incorporated, wherein each tests for different range of inputs. For example, the first mux 300 could have a range from b to 5b, while a second mux could range from 6b to 10b, and so on. Such embodiments offer more flexibility than a single five-input mux, but still utilize inexpensive components.

Method of Performing Modulus Operations Over a Limited Range

Figure 5:
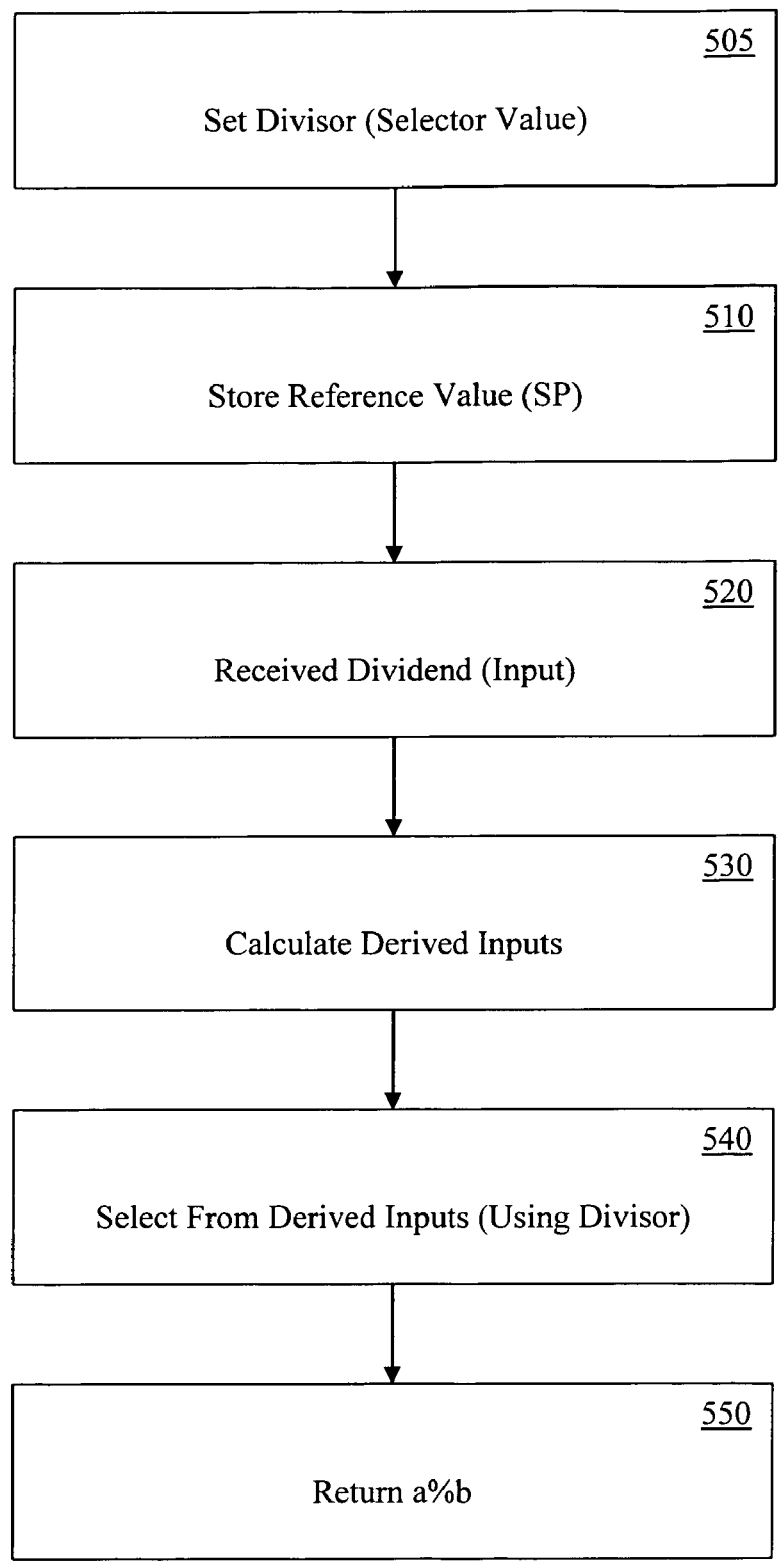
FIG. 5 depicts a flowchart of a computer implemented method of performing the modulus operation within a limited range, in accordance with one embodiment of the present invention.

With reference now to FIG. 5, a flowchart 500 of a method of performing the modulus operation within a limited range is depicted, in accordance with one embodiment of the present invention. Although specific steps are disclosed in flowchart 500, such steps are exemplary. That is, embodiments of the present invention are well suited to performing various other (additional) steps or variations of the steps recited in flowchart 500. It is appreciated that the steps in flowchart 500 may be performed in an order different than presented, and that not all of the steps in flowchart 500 may be performed.

With reference to step 505 and FIG. 4, in some embodiments, the divisor value is set. For example, in some embodiments, selector value 430 can be configured. In other embodiments, for example those where selector value 430 is hardwired into computing device 400, this step is omitted.

With reference to step 510 and FIG. 4, a reference value, or starting point value, is stored. For example, a value is stored in SP register 410. In some embodiments, this reference value may indicate the first macroblock in the current macroblock row; in other embodiments, the significance of the reference value will vary. This reference value defines the lower bound of the limited range for the modulus operation.

With reference to step 520 and FIG. 4, the dividend value is received. For example, the input value stored in input register 420, in one embodiment, is passed to mux 300. In other embodiments, mux 300 retrieves the dividend value from input register 420.

With reference to step 530 and FIG. 3, several derived input values are calculated from the dividend value. For example, derived input values 311 through 315 are derived from input 310, the dividend.

With reference to step 540 and FIG. 3, a selection is made from these derived inputs, using the divisor. For example, selector 320 is used to select between derived inputs 311 through 315, to locate the one derived input with a value greater than or equal to zero and less than b.

With reference to step 550 and FIG. 3, the result of the modulus operation is returned. For example, output 330 returns the value of a % b, or (input 310) % (selector 320).

Embodiments of the present invention are thus described. While the present invention has been described in particular embodiments, it should be appreciated that the present invention should not be construed as limited by such embodiments, but rather construed according to the following claims.

What is claimed is:

1. A computer implemented method of performing a modulus operation upon a dividend and a divisor within a prescribed range, comprising:
    accessing a reference value stored in a memory component;
    accessing said dividend value stored in a memory component;
    calculating a plurality of derived inputs, each of said derived inputs corresponding to said dividend value minus said reference value and modified by one of a plurality of multiples of said divisor; and
    selecting a result from among said plurality of derived inputs, using said divisor, said result being a nonnegative value less than the divisor.

2. The computer implemented method of claim 1, further comprising:
    setting said divisor.

3. The computer implemented method of claim 1, further comprising:
    outputting said result.

4. The computer implemented method of claim 3, wherein said outputting comprises writing said answer to a memory location.

5. The computer implemented method of claim 1, wherein each of said derived inputs is equal to said dividend minus said reference value minus said multiple of said divisor.

6. The computer implemented method of claim 1, further comprising:
    updating said reference value.

7. The computer implemented method of claim 1, wherein said modulus operation is related to a version of the H.264 video compression standard.

8. A multiplexer for performing a modulus operation upon a dividend, said multiplexer comprising:
    a selector input, for receiving a selector value;
    a plurality of value inputs, each of said plurality of value inputs corresponding to said dividend and a plurality of multiples of said selector value; and
    an output, wherein said multiplexer is operable to use said selector value to choose between said plurality of value inputs.

9. The multiplexer of claim 8, wherein each of said plurality of value inputs comprises said dividend minus a reference value minus one of said plurality of multiples of said selector value.

10. The multiplexer of claim 8, wherein said selector value is configurable.

11. The multiplexer of claim 8, wherein the number of said plurality of value inputs is configurable.

12. The multiplexer of claim 8, residing within a central processing unit (CPU).

13. The multiplexer of claim 8, residing within an expansion card configured for use with a computing system.

14. The multiplexer of claim 8, wherein said output is coupled to a writable memory.

15. A computing system, comprising:
 a multiplexer;
 a starting point register, coupled to said multiplexer;
 an input register, coupled to said multiplexer; and
 a selector value, coupled to said multiplexer, wherein said multiplexer is configured to receive a dividend value from said input register, a starting point value from said starting point register, and said selector value, and wherein said multiplexer is further configured to perform a modulus operation upon said dividend value, using said selector value, said modulus operation comprising selecting between a plurality of derived inputs, said plurality of derived inputs corresponding to said dividend, said starting point value, and said selector value.

16. The computing system of claim 15, wherein said selector value is configurable.

17. The computing system of claim 16, further comprising:
 a camera assembly, coupled to a bus; and
 a digital data storage, coupled to said bus, wherein said camera assembly and digital data storage are configured to record digital video data.

18. The computing system of claim 17, residing within a mobile telephone.

19. The computing system of claim 17, residing within a digital camcorder.

20. The computing system of claim 17, residing within a webcam.

\* \* \* \* \*